Patented Nov. 4, 1930

1,780,867

UNITED STATES PATENT OFFICE

EMANUEL CORNELLA, OF CHICAGO, ILLINOIS

INVERTED ELECTRIC MOTOR

Application filed May 2, 1929. Serial No. 359,860.

This invention aims to provide a simple inverted electrical motor, the central portion of which remains stationary, and the outer portion of which revolves, novel means being provided for constructing the outer part, or rotor, so that it will be strong and compact, a novel means being provided for journaling the rotor on the stator.

It is within the province of the disclosure to improve generally and to enhance the utility of devices of that sort to which the present invention appertains.

With the above and other objects in view, which will appear as the description proceeds, the invention resides in the combination and arrangement of parts and in the details of construction, it being understood that changes in the precise embodiment of the invention may be made, within the scope of what is claimed, without departing from the spirit of the invention.

In the accompanying drawings:—

Figure 3 is a side elevation showing the device applied to drive a vehicle wheel; and Figure 4 is a section of the structure depicted in Figure 3.

Figure 1:
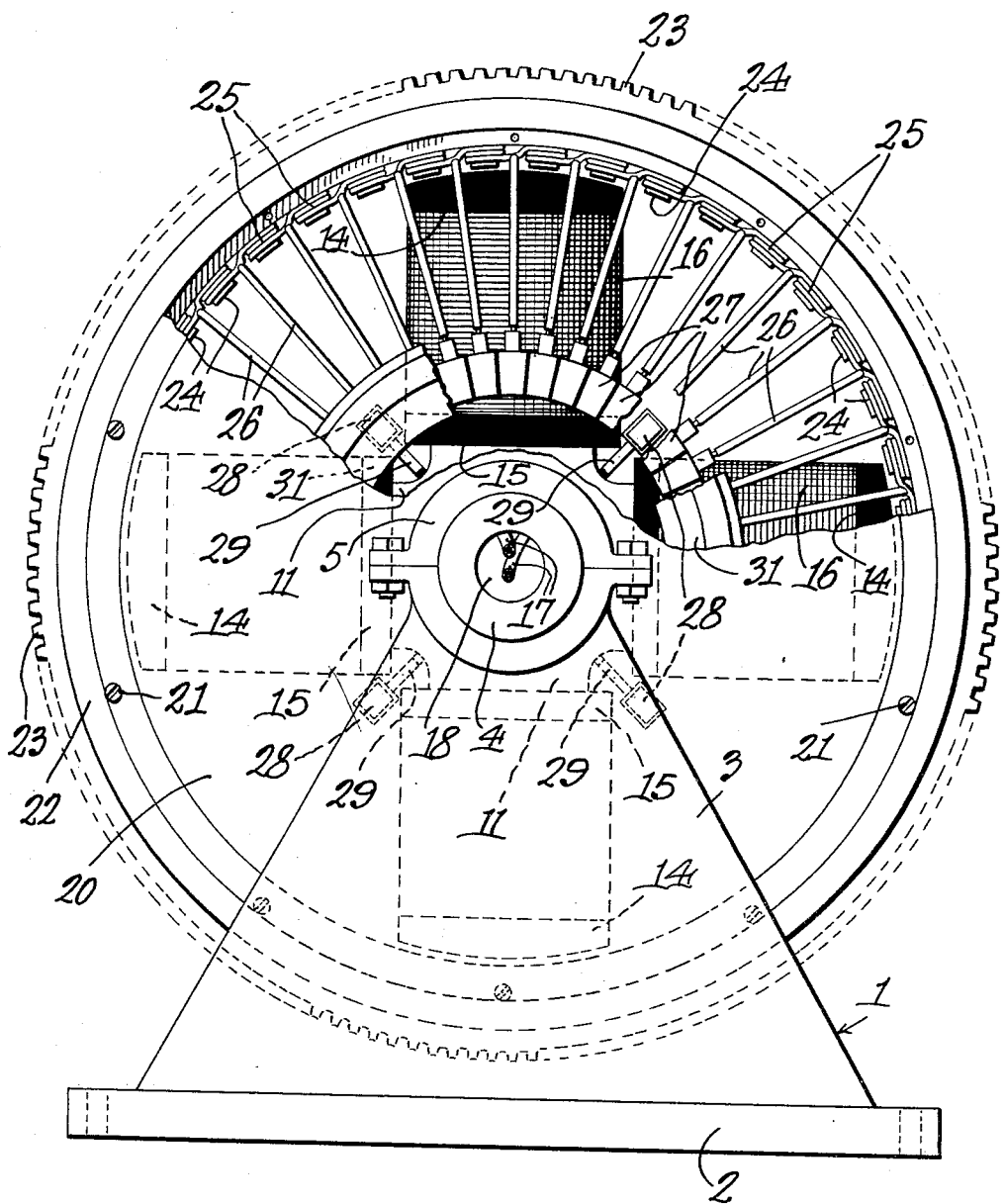
Figure 1 shows in side elevation, a device constructed in accordance with the invention, parts being broken away.

In carrying out the invention, there is provided a stator which may include a pedestal 1, the pedestal embodying a base 2 and upwardly-extending diverging standards 3. A fixed shaft 4 is held by clamps 5 on the upper end of the standards 3 against rotation. The shaft 4 has shoulders 6 against which abut bearings 7. Bearings 8 are spaced from the bearings 7 and are held in place by collars 9 which are threaded at 10 on the shaft 4. The shaft 4 has radial arms 11, the end 12 of which are enlarged to retain insulating collars 14. Insulating collars 15 are mounted on the arms 11 inwardly of the collars 14. The field windings 16 of the magnets are engaged around the arms 11, between the collars 14 and 15. The power leads 17 of the windings 16 of the magnets extend outwardly through an opening 18 in the shaft 4. The opening 18 extends inwardly from one end of the shaft 4 and opens laterally through the shaft 4 between the shoulders 6, and close to one of the shoulders 6, an observation which will be understood readily when Figures 2 of the drawings is noted.

The motor includes a rotor embodying bearing rings 19 journaled on the shaft 4 between the bearings 7—8. Outwardly converging side plates 20 are secured to the rings 19. By means of securing elements 21, an annular body 22 is secured between the side plates 20 at their peripheries. The body 22 may be supplied with a peripheral external gear 23, or any other suitable means may be provided for taking the arm off the rotor.

Figure 2:
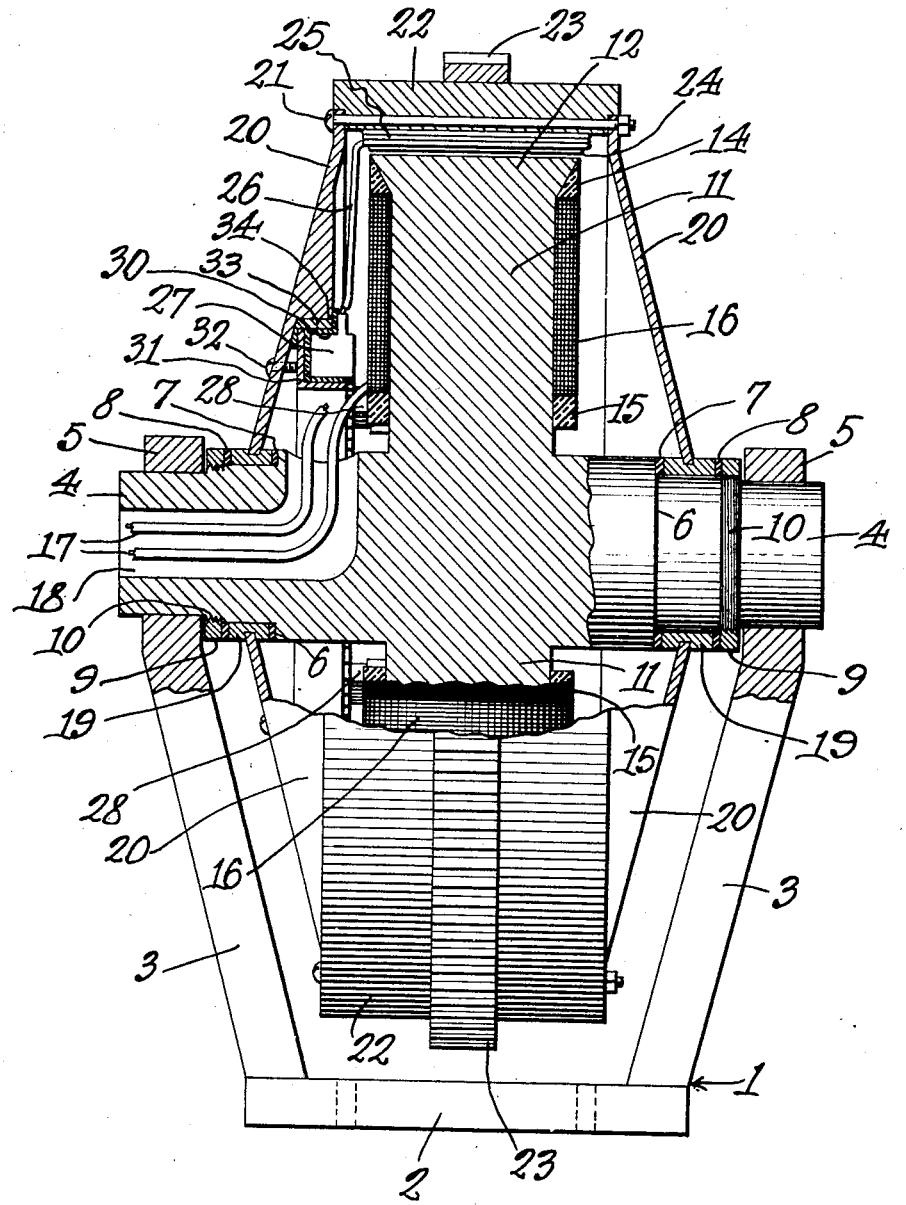
Figure 2 is a vertical section wherein parts remain in elevation.

The body 22 has inwardly extended projections 24 about which are engaged the armature windings 25, the winding 25 being connected at 26 to commutator segments 27 adapted to be engaged by brushes 28, carried in any suitable manner by supports 29. The commutator segments 27 are embedded, in the usual way, in insulating material 30 which is located within a casing including an annular retainer 31, in the form of a ring, having rectangularly disposed flanges, the ring 31 being held by securing elements 32 on one of the side plates 20, the said side plate has an internal annular shoulder 34, against which abuts a ring 33 forming part of the casing, the commutator segments 27 and the insulating material 30 being disposed within the ring 33. The part 31, called a retainer because it retains or holds the commutator segments 27 and associated parts within the ring 33 which cooperates with annular shoulder 34 which is formed on the left hand side plate 20 of the rotor, is shown in Figure 2 of the drawings.

The device operates in the usual way, stated electrically, but the external rotor, including the gear 23, turns, whereas the shaft 4 remains stationary. The device is so constructed that it is strong, compact, and well adapted to withstand hard use.

Having thus described the invention, what is claimed is:

In a motor of the class described, a stator including a fixed shaft, field magnets carried by the shaft, a rotor including rings journaled on the shaft, side plates connected to the rings, an annular body secured between the side plates, armature windings carried by the body, one side plate being thickened to form an internal annular shoulder disposed concentrically with respect to the shaft, a ring located within the shoulder and engaged therewith, commutator segments connected to the armature windings and disposed within the ring, an annular retainer disposed within the ring, the retainer embodying an inwardly extended flange arranged parallel to the shaft, and an outer flange arranged at right angles to the shaft, the outer flange extending toward therein, the flanges and the ring forming a casing for the segments, means for securing the segments to the ring and to the flanges of the retainer, and securing elements connecting the outer flange of the retainer with said side plate.

In testimony that I claim the foregoing as my own, I have hereto affixed my signature.

EMANUEL CORNELLA.